Figure 1:
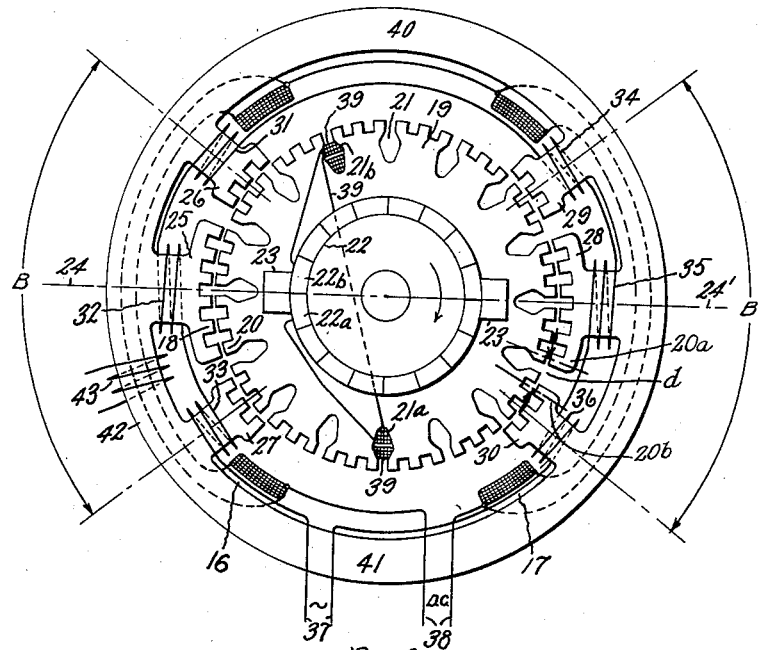

Sept. 15, 1936.  F. W. MERRILL  2,054,678
DIRECT CURRENT MOTOR INDUCTOR ALTERNATOR
Filed Nov. 17, 1934  2 Sheets-Sheet 1

Inventor:
Frank W. Merrill,
by Harry E. Dunham
His Attorney.

Sept. 15, 1936.                    F. W. MERRILL                    2,054,678
                    DIRECT CURRENT MOTOR INDUCTOR ALTERNATOR
                    Filed Nov. 17, 1934           2 Sheets-Sheet 2
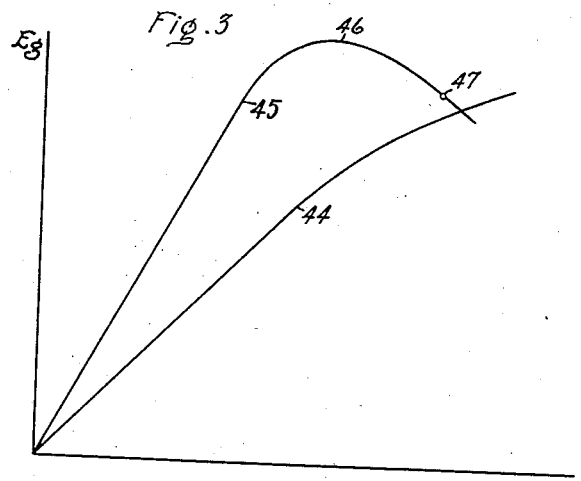
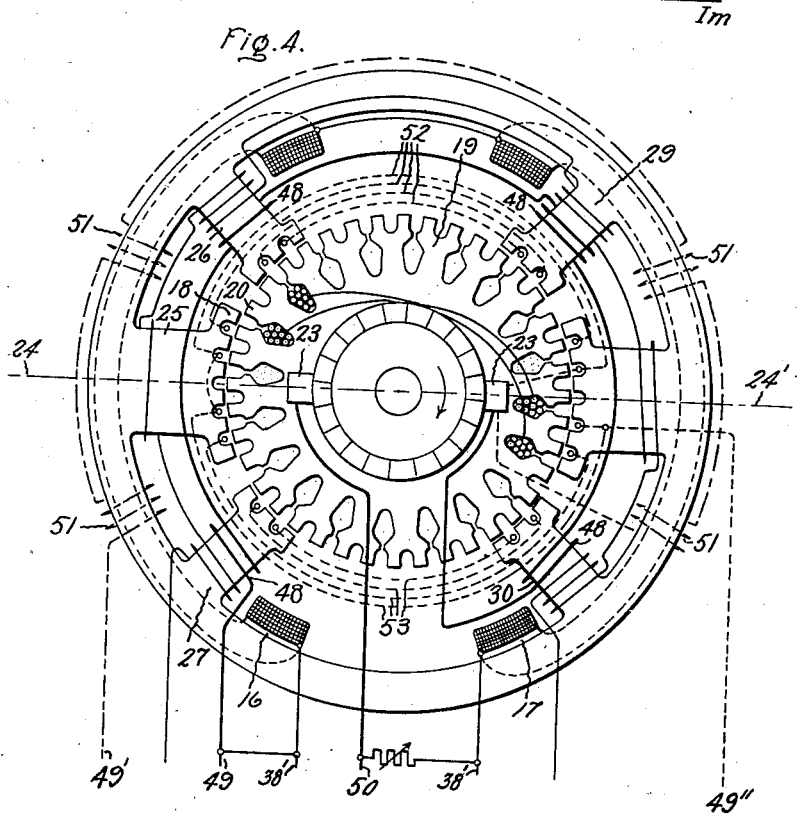
Inventor:
Frank W. Merrill,
by Harry E. Dunham
His Attorney.

Patented Sept. 15, 1936

2,054,678

UNITED STATES PATENT OFFICE 2,054,678

DIRECT-CURRENT MOTOR-INDUCTOR ALTERNATOR

Frank W. Merrill, Fort Wayne, Ind., assignor to General Electric Company, a corporation of New York Application November 17, 1934, Serial No. 753,444

19 Claims. (Cl. 171—123)

My invention relates to improvements in dynamo electrical machinery and concerns particularly apparatus of the inductor type for converting direct current into alternating current and vice versa.

It is an object of my invention to provide high-frequency alternators producing a maximum power output for a given size and weight.

Another object is to provide a construction for alternators of the inductor type having direct-current windings for either excitation or power, which will result in the improvement of commutation, the reduction of sparking at the brushes, the prevention of shifting of the magnetic neutral axis, and the prevention of oscillations in the armature magnetomotive force.

Still another object is the elimination of noise and vibration, and the elimination of high-frequency disturbances in the direct-current line.

A further object is to overcome locking when starting the apparatus directly across a direct-current line with a large initial current rush.

An additional object is to provide an arrangement for making the magnitude of the alternating-current voltage substantially independent of variations in the direct-current voltage.

Other and further objects and advantages will become apparent as the description proceeds.

In carrying out my invention in its preferred form, I provide a stator having a plurality of pole pieces with teeth thereon, and a rotor carrying teeth of the same pitch as the stator teeth. The stator pole pieces are arranged in groups of the same polarity, and pole pieces of the same polarity are angularly spaced at such intervals that half the stator teeth register with rotor slots while the other half are registering with rotor teeth in order to keep the overall reluctance of the magnetic field substantially constant. As in inductor alternators of the types already well known, both the exciting and generating windings are mounted on the stator, and current is induced in the generating windings by variations in the flux, linking the generating windings as the rotor slots and teeth alternately come opposite the stator teeth and vary the reluctance.

In my apparatus, however, I arrange the groups of pole pieces in such a manner that not only does the total flux remain substantially constant but also the flux distribution remains substantially symmetrical with respect to a neutral axis or plane as the relative flux density varies in portions of the field structure to induce the desired voltages. Where an immediate conversion is desired from direct to alternating current or vice versa in a single machine, the rotor is also provided with a commutator and with slots carrying a direct-current winding connected to the commutator.

Figure 2:
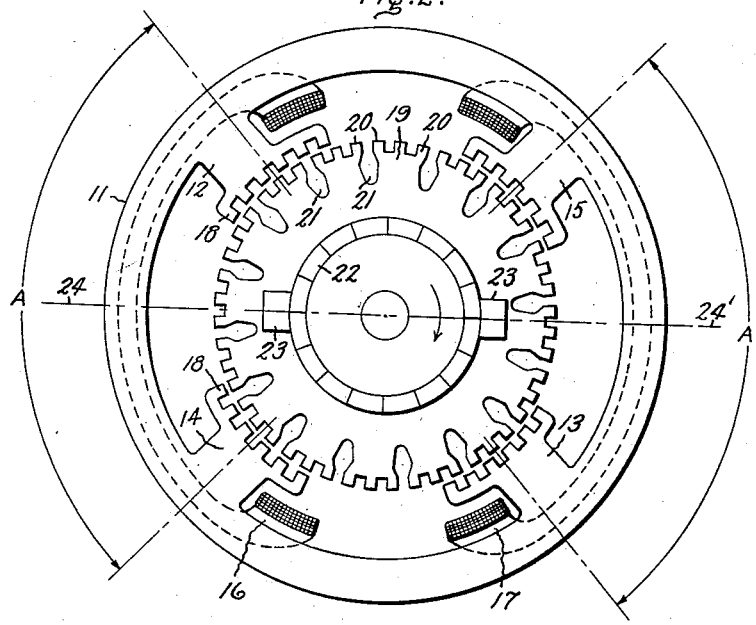

The features of my invention which I believe to be novel and patentable will be pointed out in the claims appended hereto. A better understanding of my invention, itself, however, may be obtained by referring to the following description taken in connection with the accompanying drawings in which Fig. 1 is a diagrammatic end view partially in cross section of a machine for converting direct current into alternating current or vice versa in accordance with one embodiment of my invention; Fig. 2 is a diagrammatic end view of a machine having a shifting magnetic neutral axis; Fig. 3 is a graph showing magnetization curves for my machine considered from the alternating-current and direct-current sides, and illustrating the manner in which output alternating-current voltage is made independent of variation in input direct-current voltage; and Fig. 4 represents the apparatus of Fig. 1 with the addition of armature reaction compensating windings.

In describing the structural embodiments of my invention shown for the sake of illustration, I shall for convenience refer to their use as direct-current motor-inductor alternators, i. e. combined motors and alternators, but it will be understood that my invention is not limited thereto but obviously includes using the machines as synchronous reluctance motor direct-current generators, i. e. combined alternating-current motors and direct-current generators, as well as using them as mechanically driven simple alternators or combined alternators and direct-current generators.

Where alternating current is to be generated or utilized at frequencies higher than the usual commercial frequencies, a better design of dynamo-electric machinery is frequently obtained by resorting to a construction in which both the field and armature windings or the exciting and generating windings are mounted on the stator and a toothed rotor is provided to vary the reluctance of the field structure and induce voltages in the generator windings. Reduced size and weight for a given power rating can usually be obtained in such high frequency alternators by resorting to this construction known as the "inductor type".

Where the problem consists not merely of conversion from mechanical power to alternating-current electrical power and vice versa but in conversion between alternating-current and direct-current electrical power, a further economy in size and weight can be obtained by utilizing the same field and rotor structure for alternating-current and direct-current windings somewhat analogous to the construction of dynamotors in which, however, both alternating and direct-current armature windings are mounted on the rotor, although the same field windings serve for both the alternating-current and direct-current sides of the machine.

In machines of the inductor type, it is desirable to arrange the stator teeth in such a manner that there are two groups of teeth of a given polarity so spaced that half the stator teeth of a given polarity register with rotor slots while the other half are registering with rotor teeth in order to keep the reluctance and total field flux substantially constant, thereby avoiding inductive effects in the exciting circuit. Such an arrangement for obtaining substantially constant reluctance of the field structure as a whole is disclosed in United States Patent No. 1,160,087 to Neuland.

In Fig. 2, I have illustrated the adaptation of such a field structure to a direct-current motor inductor-alternator. The field consists of stacked punchings of the shape shown with an annular portion 11 and pole pieces 12, 13, 14, and 15. A direct-current exciting winding consisting of a coil 16 surrounding pole pieces 12 and 14 and a coil 17 surrounding pole pieces 13 and 15 is so connected that pole pieces 12 and 14 are of one polarity and pole pieces 13 and 15 are of the opposite polarity. Obviously, if desired, separate excitation coils may be mounted on each pole piece, being connected to obtain the polarities above mentioned.

The pole pieces 12 to 15 are slotted to provide a plurality of teeth 18 having their inner faces along a circle coaxial with the axis of revolution of the machine and having a pitch substantially double the width of each tooth.

A rotor is provided consisting of stacked circular punchings 19 slotted to form a plurality of teeth 20 conforming substantially in width and pitch to the stator teeth 18. In addition a plurality of deeper slots 21 are provided to carry a direct-current armature winding not shown. A commutator 22 and brushes 23 are provided for connection to the direct-current armature winding in a manner which is well understood by those skilled in the art of direct-current machines and dynamos. The normal position of the brushes 23 coincides with the horizontal plane of symmetry 24, 24' of the field structure, which plane also includes the center axis of the exciting windings 16 and 17.

It will be readily understood that the flux produced by the exciting windings 16 and 17 will pass through the rotor 19 between pairs of pole pieces 12, 14 and 13, 15 and will react with the rotor windings to produce rotation of the rotor if the brushes 23 are connected to a direct-current source.

It will be observed that the stator teeth on pole pieces 14 and 15 are in line with the rotor teeth and that the stator teeth of pole pieces 12 and 13 are in line instead with the rotor slots so that, in the rotor position shown in Fig. 2, the minimum reluctance is along pole pieces 14 and 15 and the maximum reluctance is along pole pieces 12 and 13. When the rotor 19 has rotated one-half tooth pitch, the situation will obviously be reversed and the minimum reluctance will be along pole pieces 12 and 13 and the maximum reluctance will be along pole pieces 14 and 15. In consequence, the flux through any one of the pole pieces varies at a relatively high frequency, depending upon the number of teeth and the speed of rotation of the rotor so that relatively high-frequency alternating currents may be generated by placing generating windings on the pole pieces 12 to 15.

The total reluctance of the magnetic field as a whole considered with respect to the field windings 16 and 17 remains substantially constant owing to the fact that increase in flux through one pair of opposite pole pieces is compensated by a corresponding decrease in flux through the other pair of opposite pole pieces as the flux distribution changes. However, there will be a shifting in the neutral axis of the magnetic flux through the angle A occurring at the high frequency of the alternating current to be generated in the windings on the pole pieces 12 to 15. This shifting in the magnetic neutral axis would not be highly objectionable in a simple inductor alternator or inductor type synchronous motor, but, when a direct-current winding is added to the rotor, difficulties arise owing to the fact that the proper operation of a direct-current machine depends upon placing the brushes, such as the brushes 23, in the neutral axis of the magnetic field.

In the arrangement of Fig. 2, the shifting magnetic field in effect causes the rotor magnetomotive force determined by the rotor conductor current and the number of rotor conductors lying within the angle A, to be alternately magnetizing and demagnetizing. Consequently, the shifting of the magnetic field would tend to induce high-frequency currents in the field coils and in the rotor conductors short-circuited by the brushes. In consequence, excessive heating and losses, electrical noise in the direct-current exciting line, and poor commutation tend to result from using the construction of Fig. 2.

In order to overcome these disadvantages of a shifting magnetic field, where the direct-current winding is to be mounted on the same rotor, I modify the arrangement of the stator pole pieces in such a manner as to cause the neutral axis of the flux produced by the exciting windings to remain in the same plane 24, 24'. This result may be accomplished as illustrated in Fig. 1 by substituting for each adjacent pair of pole pieces of the same polarity, such as the pole pieces 12 and 14 of Fig. 2, a symmetrically arranged group of pole pieces such as the center pole piece 25 and the side pole pieces 26 and 27 in Fig. 1. Preferably, the side pole pieces have half as many teeth as the center pole pieces in order that the total permeance of each pair of side pole pieces will equal the permeance of the center pole piece. The corresponding group of pole pieces 28, 29, and 30, is also provided so as to form a two-pole machine but it will be understood that any number of pairs of groups of pole pieces may be provided corresponding to multipolar machines of other types.

It will be evident that the teeth of the side pole pieces register with teeth of the rotor when the teeth of the center pole pieces register with slots of the rotor and, vice versa, the teeth of the side pole pieces register with slots of the rotor when the teeth of the center pole pieces register with teeth of the rotor. In other words, the distance measured circumferentially in the air gap between the centers of adjacent end teeth of different pole pieces in any group is equal to an odd multiple of one-half the tooth pitch. By an "odd multiple of half the tooth pitch" I mean one-half the tooth pitch, i. e., one-half the distance between centers of teeth on any pole piece multiplied by any odd number, including 1, 3, 5, etc. For example, the distance $d$ between the centers of the tooth 29a on the pole piece 28 in Fig. 1 and tooth 29b on the pole piece 30 is one and one-half times the tooth pitch or three times half the tooth pitch.

In the arrangement shown in Fig. 1, generating windings may be mounted on each of the pole pieces 25 to 30. For example, generating windings 31 to 36 may be mounted upon pole pieces 25 to 30, respectively, and connected in series to leads 37 serving as the alternating-current terminals of the machine. The generating coils 31, 33, and 35 are wound in one relative direction and generating coils 32, 34, and 36 are wound in the opposite relative direction. Exciting windings 16 and 17 may be connected in series to a suitable source of direct current through the leads 38. The connections are such, of course, that pole pieces 25, 26, and 27 are of one polarity and pole pieces 28, 29, and 30 are of the opposite polarity.

Any suitable type of direct-current armature winding may be placed in the slots 21 of the rotor. For example, if desired, a short pitch, drum wound, lap winding may be employed. To avoid confusion in the drawings, armature conductors are shown occupying only slots 21a and 21b. One complete armature coil 39 is represented as occupying the lower portion of the slot 21a and the upper portion of the slot 21b with leads connected to commutator segments 22a and 22b, respectively, in accordance with well known practice. The conductors in the lower portion of slot 21b and the upper portion of slot 21a, of course, belong to two other armature coils not completely shown. The windings 16 and 17 may either be connected to a separate source of direct-current at 38 or in parallel with the rotor winding and the direct-current power circuit through leads 38', as shown in Fig. 4.

If it be assumed that the machine is driven from the direct-current side and that the brushes 23 and the field leads 38 are connected to a suitable source of direct current, the following operation will take place:

The armature will be caused to rotate as a direct-current motor by the reaction between the direct-current field produced by the windings 16 and 17 and the current flowing in the armature conductors in the slots 21. As the armature rotates, the reluctances of the portions of the magnetic circuits through pole pieces 25 to 30 and, consequently, the fluxes in these pole pieces will vary at a rate determined by the rate at which the stator teeth 18 and the rotor teeth 20 pass each other, the time required for one of the rotor teeth 20 to move through a complete tooth pitch corresponding to a complete cycle in the flux variation. Accordingly, voltages will be induced in the generating windings 31 to 36, inclusive.

If clockwise rotation of the rotor is assumed, the flux in pole piece 25 will decrease as the rotor advances from the position shown in Fig. 1 to the position shown in Fig. 4 with the rotor teeth 20 opposite the slots between the stator teeth 18 while, at the same time, the fluxes in pole pieces 26 and 27 will be increasing since the rotor teeth are approaching the position of alignment with the stator teeth of the side pole pieces 26 and 27. Accordingly, the voltages induced in windings 31 and 33 are opposite in polarity to the voltages induced in the winding 32. For this reason, the winding 32 is wound oppositely to windings 31 and 33 if it is to be connected in series with the other two windings. As the pole piece 28 has the opposite polarity to pole piece 25, the winding 35 is wound in the opposite direction relative to winding 32 and similarly windings 34 and 36 are wound oppositely relative to windings 31 and 33.

With the rotor in the position shown in Fig. 1, the maximum flux flows through pole pieces 25 and 28 and, with the rotor advanced one-half tooth pitch, the minimum flux flows through pole pieces 25 and 28 and the amount of flux equal to the maximum is divided equally between pole pieces 26 and 27 and between pole pieces 29 and 30. Consequently, the distribution of the flux between the center and side pole pieces of a group varies at a rate corresponding to the frequency of the voltages to be induced but the neutral axis remains through the axis 24, 24', which normally corresponds to the axis of the brushes 23. It will be apparent that the flux through portions 40 and 41 of the stator punchings, consequently, the flux linking the exciting windings 16 and 17, will remain constant. On the other hand, the flux in the portions of the stator punchings between two of the pole pieces of like polarity, as in the portion 42, will vary in magnitude at the rate at which the flux path expands and contracts. Consequently, generating windings, such as the winding 43, may also be placed at such portions of the stator.

Inasmuch as the neutral axis of the flux path not merely remains horizontal by not shifting angularly, but also remains along the same line as plane 24, 24', i. e., through the center of the rotor, variations in the point of application of resultant magnetic forces and unbalanced magnetic pull between stator and rotor are prevented. In this way, a source of mechanical vibration and noise is eliminated.

Although I have described the advantages of my invention in preventing shifting of the magnetic neutral axis in connection with machines having direct-current load windings on the rotor, it will be understood that my invention is not limited thereto, but embraces the prevention of shifting of the magnetic neutral axis of the field flux in a machine carrying direct-current windings of any kind on the rotor, whether these windings carry load currents or excitation currents.

In Fig. 3, the curve 44 represents the magnetization curve of a direct-current machine in which the flux or the proportionate generated voltage $Eg$ is plotted along the vertical axis against magnetizing force or exciting current $Im$ plotted along the horizontal axis. The magnetization curve of an inductor or reluctance type alternating-current machine is represented by the curve 45 in which the root mean square alternating induced voltage is plotted along the vertical axis, $Eg$, against exciting current $Im$ on the horizontal scale. It will be observed that the direct-current magnetization curve 44 tends to flatten out gradually as the flux path becomes saturated. The alternating-current magnetization curve 45, however, begins to droop at the point 46 as a result of saturation, owing to the fact that, with increased saturation, a smaller variation in flux takes place. The difference in characteristic of curves 44 and 45 may be made use of to obtain a substantially constant alternating-current output voltage even though the direct-current input voltage may vary somewhat when the machine operates from direct-current to alternating-current or vice versa when the machine operates from alternating-current to direct-current. This is of particular value in self-excited machines or machines with the field 16—17 connected in shunt with the direct current rotor winding, since load fluctuations may tend to cause fluctuations in both speed and in excitation voltage. The constants of the machine are so chosen that, normally, the machine operates at a point 47 on the alternating-current voltage curve so that, if the direct-current applied voltage is decreased tending to decrease the speed, and hence the alternating-current voltage, the direct-current exciting current is also decreased and the alternating-current operation point is moved toward the point 46 on the curve 45 sufficiently to overcome substantially the effect on the alternating-current voltage of the decreased direct-current applied voltage. If the machine is so used that it is not subject to variations in its own load and if the direct-current characteristics are such that relatively little or inappreciable variation in speed takes place with variation in direct current applied voltage, the machine will be adjusted to operate at the rounded top portion of the curve 45 near the point 46, thus maintaining a substantially constant alternating-current voltage in spite of variations in direct-current applied voltage and excitation.

Likewise, when operating the machine self-excited as a combined direct-current generator and alternator with an external mechanical driving force, the shape and relationship of the magnetization curves 44 and 45 may be made use of to compensate the alternating-current generated voltage for variations in excitation resulting from variations in speed of the driving force. Where the machine is to be operated under conditions where it may be subjected to the flow of heavy armature currents, such as starting by throwing directly across the direct-current line without armature starting resistance, it is desirable to provide means for compensating the armature cross magnetomotive force. This is particularly true in machines having the same rotor and stator tooth pitches when the design is such that the flux path for the armature magnetomotive force is primarily through pole pieces, the teeth of which line up simultaneously with rotor teeth. Since the armature reaction is in a direction perpendicular to the neutral axis of the exciting field, excessive starting current would produce a strong flux in a vertical direction through the rotor which might tend to lock the rotor through pole pieces 26, 27, 29 and 30 when the teeth of these pole pieces are in alignment with the teeth on the rotor as shown in Fig. 4.

This locking tendency results from the fact that, although the reluctance of the field structure is substantially constant with respect to the exciting windings 16 and 17, it is not constant with respect to the armature reaction. Actual locking will take place, of course, only if the restraining torque due to the cross flux in the aligned teeth is stronger than the torque of the direct-current winding and the main field, due to the same current inrush. In order to overcome this effect, in cases where it is desired to throw the machine directly across a direct-current line from standstill without means for limiting the initial current rush, means may be provided for compensating the armature reaction. For example, as illustrated in Fig. 4, compensating windings 48 may be mounted on pole pieces 26, 27, 29, and 30, and connected in series with the direct-current line and brushes 23 so that direct-current is applied through leads 49 and 50. The compensating windings 48 are so connected as to tend to magnetize pole pieces 27 and 30 with one polarity and pole pieces 26 and 29 with the opposite polarity.

While I prefer to utilize compensating coils 48 mounted in the position shown, my invention is not limited to this precise arrangement and any suitable form of compensation may be employed. For example, compensating coils 51 may be mounted on the annular portion of the stator punchings between the pole pieces of like polarity, the connections being such that the compensating windings tend to produce flux flowing from the top to the bottom of the field structure or vice versa, depending upon the direction of the armature reaction. If the compensating windings 51 are employed, the direct-current load input terminals will be 49' and 50.

Another compensating arrangement which may be employed consists of concentric chain windings of the type sometimes used as field windings in alternating-current machinery mounted in the stator slots formed between the stator teeth 18. For example, such a compensating winding 52 may be mounted in the stator slots above the magnetic neutral axis 24, 24' and compensating winding 53 may be mounted in the stator slots below the magnetic neutral axis 24, 24', the two windings being connected in series with the brushes 23 and brought out to the source of direct-current power input through terminals 49'' and 50.

Although in a commutating direct-current dynamo-electric machine, the construction ordinarily preferred is that in which the commutated winding and its commutator are contained in the rotating member and the cooperating brushes are on the stationary member, it is known to the art that the arrangement can be inverted and that the commutated winding and its commutator may be stationary and the exciting member together with the brushes may form the rotating member. For convenience, I have illustrated and described the more usual arrangement in which the commutated windings are movable and the exciting windings are stationary, but it will be understood that my invention is not limited thereto and includes the inverted arrangement.

In accordance with the provisions of the patent statutes, I have described the principles of operation of my invention together with the apparatus which I now consider to represent the best embodiment thereof but I desire to have it understood that the apparatus shown is only illustrative and that the invention may be carried out by other means.

What I claim as new and desire to secure by Letters Patent of the United States is:

1. A dynamo-electric machine comprising in combination, a pair of relatively movable toothed members, one of which has toothed pole portions in groups and current conducting windings mounted on said pole portions, each pole portion in a given group having the same polarity, said pole portions having teeth thereon with a given uniform tooth pitch, each group of pole portions consisting of a center pole portion and outer pole portions on either side thereof, the pole portions in any group being positioned with the distance between centers of adjacent end teeth on different pole portions substantially equal to an odd multiple of half the tooth pitch.

2. A dynamo-electric machine comprising in combination a pair of relatively movable toothed members, one of which includes toothed pole portions in groups, exciting windings magnetizing each pole portion in a given group with the same polarity, and alternating-current windings linking fluxes produced in said pole portions, said pole portions having teeth thereon with a given uniform tooth pitch, each group of pole portions including a center pole portion and pole portions on either side thereof positioned with the distance between centers of adjacent end teeth on different pole portions substantially equal to an odd multiple of half the tooth pitch.

3. In a dynamo-electric machine, a field structure with a plurality of groups of toothed pole portions, each group including three pole portions of like polarity, said pole portions having teeth thereon with a given uniform tooth pitch, the pole portions of each group being positioned with the distance between centers of adjacent end teeth on different pole portions substantially equal to an odd multiple of half the tooth pitch.

4. In a dynamo-electric machine, a field structure having pole pieces in groups of three, each pole piece having teeth thereon with a given uniform tooth pitch and each pole piece being spaced from the other pole pieces in its group with the distance between centers of adjacent end teeth on different pole portions substantially equal to an odd multiple of half the tooth pitch, and a toothed member having slots adapted to receive a direct-current winding, said field and said latter member being relatively movable.

5. A dynamo-electric machine comprising in combination, a toothed rotor with slots carrying a direct-current winding, a stator with toothed pole portions in groups, an exciting winding magnetizing each pole portion in a given group with the same polarity, and alternating-current windings linking fluxes produced in said pole portions, each group of pole portions comprising an odd number of pole portions with teeth thereon having a given uniform tooth pitch, the pole portions in a group being positioned with the distance between centers of adjacent end teeth on different pole portions substantially equal to an odd multiple of half the tooth pitch.

6. A dynamo-electric machine comprising in combination, a toothed rotor with slots carrying a direct-current winding and a commutator connected to said winding, a pair of brushes cooperating with said commutator, a stator having a pair of pole groups symmetrical with respect to a plane through the axis of said rotor and a line coinciding substantially with the line of said brushes, an exciting winding magnetizing one pole group with a given polarity and the other pole group with an opposite polarity, each pole group including pole pieces having teeth thereon with a given uniform tooth pitch, the pole pieces in a group being positioned with the distance between centers of adjacent end teeth on different pole portions substantially equal to an odd multiple of half the tooth pitch.

7. A dynamo-electric machine comprising in combination, a toothed rotor with slots carrying a direct-current winding and a commutator connected to said winding, at least one pair of brushes cooperating with said commutator, a stator having an even number of pole groups, each symmetrical with respect to a plane through the axis of said rotor, with the planes of symmetry of at least one pair of pole groups in substantially the same angular positions as a pair of said brushes, and an exciting winding magnetizing alternate pole groups with opposite polarity, each pole group including pole pieces having teeth thereon with a given uniform tooth pitch, the pole pieces in each group being positioned with the distance between centers of adjacent end teeth on different pole portions substantially equal to an odd multiple of half the tooth pitch.

8. In a dynamo-electric machine, the combination of a toothed rotor carrying a direct-current winding and a commutator connected to said winding, a stator with an even number of groups of pole portions, each group including an inner pole portion and outer pole portions on either side of said center pole portion, an exciting winding magnetizing the pole portions of each group with the same polarity and alternate groups with opposite polarities, said pole portions having teeth thereon with a uniform tooth pitch, the pole pieces within each group being positioned with the distance between centers of adjacent end teeth on different pole portions substantially equal to an odd multiple of half the tooth pitch, and a compensating winding connected in series with said direct-current winding through said brushes and wound to tend to magnetize adjacent outer pole portions in adjacent pole groups with the same polarity and to magnetize the outer pole portions of the same group with opposite polarities.

9. In a dynamo-electric machine, a field structure having an even number of groups of pole pieces, each group including a center pole piece and outer pole pieces on either side thereof, an exciting winding connected to magnetize each pole piece in a given group with the same polarity and alternate pole groups with opposite polarities, and a compensating winding connected to tend to magnetize only said outer pole pieces, tending to magnetize adjacent pole pieces in different groups with the same polarity and outer pole pieces in the same group with different polarities.

10. In an inductor dynamo-electric machine, a magnetic field structure with alternate portions of opposite direct-current polarities, each of said field portions having teeth including a center group of teeth and outer groups of teeth on either side thereof, and a direct-current compensating winding connected to tend to magnetize only said outer groups of teeth, tending to magnetize adjacent groups of teeth in different field portions with the same polarity and outer groups of teeth in the same field portion with different polarities.

11. In an inductor dynamo-electric machine, a magnetic field structure with alternate portions of opposite direct-current polarities, each of said field portions having a center part and outer parts on either side thereof, and a direct-current compensating winding connected to tend to magnetize only said outer parts, tending to magnetize adjacent parts of different field portions with the same polarity and outer parts in the same field portions with different polarities.

12. A dynamo-electric machine of the reluctance type providing intermittently-variable-reluctance magnetic circuits, said machine having alternating-current and direct-current windings in separate electrical circuits and having a magnetic core with branched portions, each included in one of said magnetic circuits and carrying said alternating-current winding, and an exciting winding in shunt with the direct-current winding, mounted on said core and linked by said branched core portions in parallel, said exciting winding carrying a current of such magnitude as to saturate said branched core portions during minimum reluctance of their respective magnetic circuits, whereby a drop in voltage applied to the direct-current windings produces a decrease in saturation and an increase in flux variation in said branched core portions and the drop in voltage applied to the direct-current windings is accompanied by a compensating rise in voltage generated in the alternating-current windings tending to maintain the alternating-current voltage under decreased rotational speed and drop in direct-current voltage.

13. A dynamo-electric machine of the reluctance type having alternating-current and direct-current windings in separate electrical circuits, having a magnetic core with an intermittently-variable-reluctance magnetic circuit linking said alternating-current winding, and having an exciting winding in shunt with said direct-current winding and linked by said magnetic circuit, said exciting winding carrying a current of such magnitude as to saturate said magnetic circuit during minimum reluctance, whereby a drop in voltage applied to the direct-current windings produces a decrease in saturation and an increase in flux variation in said magnetic circuit and the drop in voltage applied to the direct-current windings is accompanied by a compensating rise in voltage generated in the alternating-current windings tending to maintain the alternating-current voltage under decreased rotational speed and drop in direct-current voltage.

14. A direct-current motor-inductor alternator having a pair of relatively movable toothed members with corresponding groups of teeth in alignment at different relative positions of said members, one of which carries a direct-current winding, and the other of which carries an exciting winding and an alternating-current winding, in the latter of which voltages are induced by flux variations as the teeth of the relatively movable members come into and out of alignment to vary the magnetic reluctances, said latter toothed member being divided to form parallel magnetic circuits, one of which includes teeth not in alignment at the instant when another includes teeth in alignment, said alternating-current winding being divided into separate portions, each linking one of said magnetic circuits, said exciting winding linking said magnetic circuits in parallel and carrying current of such magnitude as to saturate any of said magnetic circuits when the teeth therein are in alignment, whereby a drop in voltage applied to the exciting winding produces a decrease in saturation and an increase in flux variation in said magnetic circuits and, consequently, a rise in voltage generated in said alternating-current winding.

15. In a dynamo-electric machine comprising a pair of relatively movable toothed members with teeth coming alternately into and out of alignment to provide a magnetic circuit varying intermittently in reluctance, an exciting winding and an alternating-current winding, both of which link said magnetic circuit, said exciting winding carrying a current of such magnitude as to saturate said magnetic circuit when the teeth are in alignment.

16. A dynamo-electric machine of the reluctance type having a core with an intermittently-variable-reluctance magnetic circuit, an alternating-current winding and a direct-current exciting winding on said core, each linking said magnetic circuit, said exciting winding carrying a current of such magnitude as to saturate said magnetic circuit while its reluctance is at a minimum.

17. A dynamo-electric machine having alternating current and direct-current windings, an exciting winding, a field structure common to said alternating-current winding and said exciting winding and having branched portions included in parallel magnetic circuits, and means for varying the relative reluctances of the magnetic circuits including said branched core portions, said alternating-current winding being divided into portions, each wound on one of the branched portions of said field structure, said exciting winding carrying a current of such magnitude as to saturate any of said magnetic circuits while its reluctance is at a minimum.

18. A dynamo-electric machine having an alternating-current and an exciting winding, and a toothed field structure common to said alternating-current winding and said exciting winding, said field structure having teeth included in parallel magnetic circuits and means for intermittently varying the relative reluctances of said magnetic circuits, said exciting winding carrying a current of such magnitude as to saturate the teeth in one of said magnetic circuits while said magnetic circuit is in its condition of minimum reluctance.

19. In a dynamo-electric machine of the reluctance type having a magnetic core with branched portions included in parallel magnetic circuits, means for intermittently varying the relative reluctances of said magnetic circuits, an alternating-current winding with separate portions each linking one of said magnetic circuits and an exciting winding linking said magnetic circuits in parallel and carrying a current of such magnitude as to saturate any of said magnetic circuits under its minimum reluctance condition.

FRANK W. MERRILL.